(12) United States Patent
Nair

(10) Patent No.: US 6,751,792 B1
(45) Date of Patent: Jun. 15, 2004

(54) USING VALUE-EXPRESSION GRAPHS FOR DATA-FLOW OPTIMIZATIONS

(75) Inventor: Sreekumar Ramakrishnan Nair, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 449 days.

(21) Appl. No.: 09/679,945

(22) Filed: Oct. 4, 2000

(51) Int. Cl.$^7$ .................................................. G06E 9/45
(52) U.S. Cl. ........................ 717/161; 717/140; 717/151; 717/156
(58) Field of Search ................................ 717/140, 144, 717/151, 152, 156, 161, 163

(56) References Cited

U.S. PATENT DOCUMENTS

| | | | | |
|---|---|---|---|---|
| 5,313,614 A | | 5/1994 | Goettelmann et al. | 395/500 |
| 5,347,654 A | | 9/1994 | Sabot et al. | 395/600 |
| 5,469,572 A | * | 11/1995 | Taylor | 717/152 |
| 5,493,675 A | | 2/1996 | Faiman, Jr. et al. | 395/700 |
| 5,613,117 A | * | 3/1997 | Davidson et al. | 717/144 |
| 5,758,061 A | | 5/1998 | Plum | 395/183.11 |
| 5,999,737 A | * | 12/1999 | Srivastava | 717/162 |
| 6,260,190 B1 | * | 7/2001 | Ju | 717/156 |
| 6,301,704 B1 | * | 10/2001 | Chow et al. | 717/146 |
| 6,549,930 B1 | * | 4/2003 | Chrysos et al. | 709/104 |
| 2002/0032718 A1 | * | 3/2002 | Yates et al. | 709/107 |
| 2002/0037496 A1 | * | 3/2002 | Jacobson et al. | 435/4 |

OTHER PUBLICATIONS

Aho, Alfred V., Ganapathi, Mahadevan, Tjiang, Steven W. K., "Code Generation Using Tree Matching and Dynamic Programming", 1989, p. 491–516, retrieved from ACM Portal database, May 30, 2003.*

Cytron, Ron, Ferrante, Jeanne, Rosen, Barry K. and Wegman, Mark N., "Efficiently Computing Static Single Assignment Form and the Control Dependence Graph", 1991, p. 451–467, retrieved from ACM Portal database, May 30, 2003.*

Moon, Soo–Mook and Ebcioglu, Kemal, "An Efficient Resource–Constrained Global Scheduling Technique for Superscalar and VLIW processors", 1992, p. 55–71, retrieved from IEEE database May 30, 2003.*

"PowerPC Instruction Set Overview", (three operand instructions in the RISC instruction set), retrieved from http://physinfo.ulb.ac.be/divers_html/p...g_info/intro_to_ppc/ppc3_software1 by a google.com search May 30, 2003.*

* cited by examiner

*Primary Examiner*—Wei Zhen
*Assistant Examiner*—Mary Steelman
(74) *Attorney, Agent, or Firm*—Martine & Penilla, LLP

(57) ABSTRACT

A new method and apparatus for use in post compilation optimizers is presented. The present invention is based on the use of a new graphical representation of code in a linked program called an operands graph. An operands graph combines the best evaluative features of flow graphs in single static-assignment (SSA) form and of value range optimizations. The result is a new ability to evaluate and optimize previously hidden code segments, including code segments only reachable from the various branches of a mutliway branch instructions.

19 Claims, 6 Drawing Sheets

Elements Of An Operands Graph

Prior Art Cache

TYPICAL COMPILER
(Prior Art)

TYPICAL UNIX/SUN COMPILER
(Prior Art)

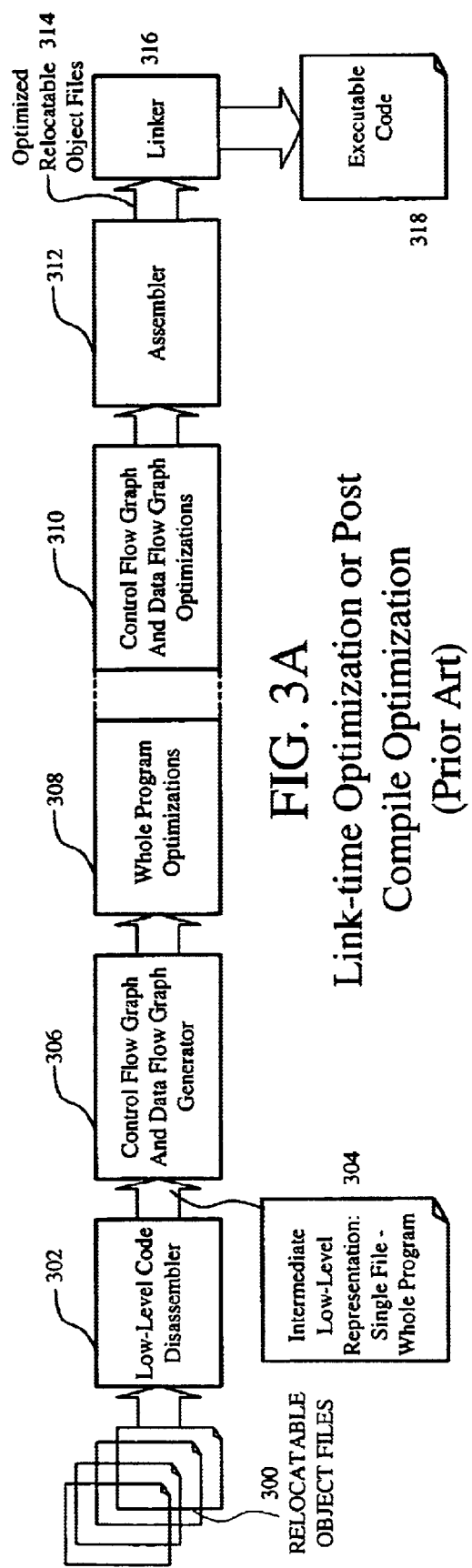
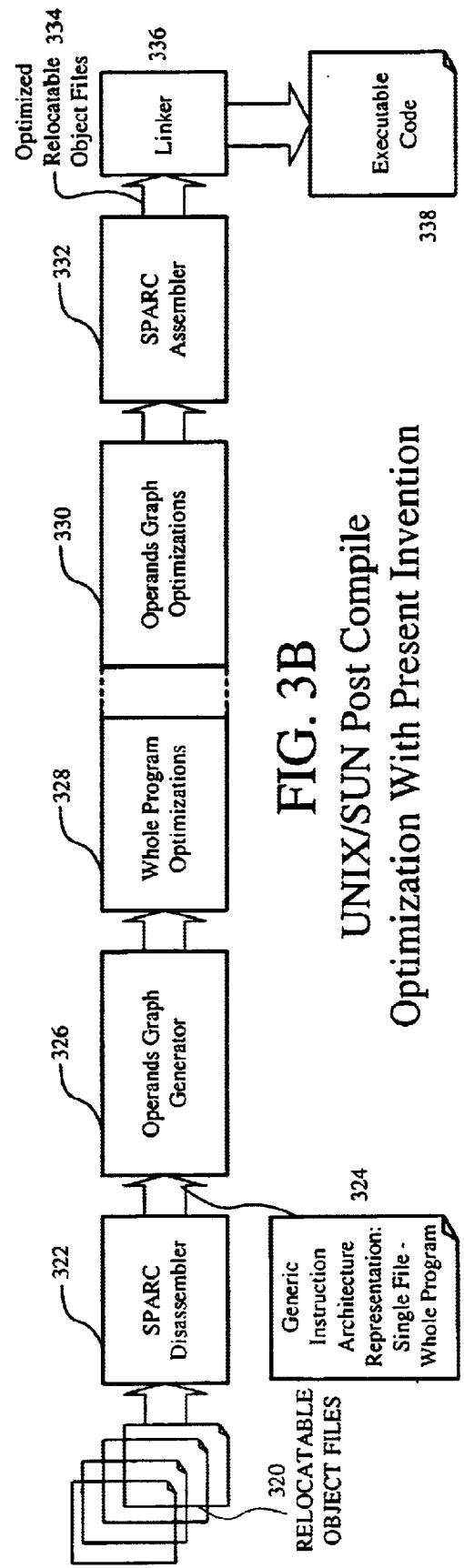
FIG. 3A
Link-time Optimization or Post Compile Optimization (Prior Art)
FIG. 3B
UNIX/SUN Post Compile Optimization With Present Invention Elements Of An Operands Graph Graphical Hierarchy

SYSTEM WITH COMPILER ACCORDING TO THE CURRENT INVENTION

COMPILER ACCORDING TO THE PRESENT INVENTION

USING VALUE-EXPRESSION GRAPHS FOR DATA-FLOW OPTIMIZATIONS

BACKGROUND OF THE INVENTION

1. Field of the Invention

This invention pertains generally to software compilation and optimization. More particularly this invention is directed to a system land method for using a unique graphical representation of programs which enables new optimizations in a link-time or "post compilation" optimizer.

2. The Prior Art

Current computer systems include, among other things, a memory system and a processing unit (or processor or central processing unit (CPU)). A memory system serves as a repository of information, while the CPU accesses information from the memory system, operates on it, and stores it back.

Complexity exists within the CPU as well as at the CPU/memory system interface. Looking at the CPU/memory interface, it is well known that CPU clock speeds are increasing at a faster rate than memory speeds. The creates a time gap, typically measured in clock cycles of the CPU, between, the request for information in memory to when the information is available inside the CPU. If a CPU is executing instructions in a linear manner, when a currently executing instruction needs to read a memory location from the memory system, the request is "very urgent". The processor must wait, or stalls, while the memory system provides the data requested to the CPU. The number of CPU clock cycles between the clock cycle when the memory request was made to the cycle where the data is available to the instruction that needed it in the CPU is called the latency of the memory.

Caches are used to help alleviate the latency problem when reading from main memory. A cache is specially configured, high-speed, expensive memory in addition to the conventional memory (or main memory). FIG. 1 depicts a conventional hierarchical memory system, where a CPU is operatively coupled to a cache, and the cache is operatively coupled to the main memory. By placing the cache (small, relatively fast, expensive memory) between main memory (large, relatively slow memory) and the CPU, the memory system as a whole system is able to satisfy a substantial number of requests from the CPU at the speed of the cache, thereby reducing the overall latency of the system.

When the data requested by the CPU is in the cache (known as a "hit"), the request is satisfied at the speed of the cache. However, when the data requested by the CPU is not in the cache (known as a "miss"), the CPU must wait until the data is provided from the slower main memory to the cache and then to the CPU, resulting in greater latency. To help address the problem of latency and to increase the hit to miss ratio associated with cache memory, computer systems have included instructions for prefetching data from memory to cache. For example, instructions set architectures (ISA's), such as SPARC™ V9, support software data prefetch operations. The instruction's use, however, is left entirely to the program executing in the CPU. It may not be used all, or it may be used with little or no intelligence, adding little in the way added performance. Because the level of knowledge needed about the CPU and its memory is extremely detailed in order to effectively use prefetch instructions, their use is generally left to compilers.

In addition to the need for optimizations to handle the CPU/memory interface, optimizations are always needed within the CPU. Any optimization that maximizes the use of local registers (internal CPU registers) and internal execution units will not only speed up execution because all data and instructions are local or internal, such optimizations will minimize processor stalls by minimizing the number of times data or instructions need to be read from main memory into cache, and then into the CPU.

Additionally, there is the problem of effectively optimizing code bases (program modules) over an entire program. For anything other than small applications, the code is spread through many files. Traditional optimizers work on one of these files at a time, leaving any optimizations that cross file boundaries untouched.

Accordingly, there is an urgent need for a method and apparatus which can optimize code to minimize cache misses and maximize the internal efficiency of code using the CPU. The present invention satisfies this need and other deficiencies found in the background art.

BRIEF DESCRIPTION OF THE INVENTION

The present invention includes a new method and apparatus for optimizing compiled programs. In the prior art, most optimizations are carried out during compilation, before linking. Recently some optimizers have been designed to work on the code after compilation. These types of optimizers are called link-time optimizers or post compilation optimizers. An advantage of such optimizers is that they can look at the entire compiled code base, rather than individual files before linking. The present invention builds on the advantage of post compilation optimization with the use of a new graphical representation of a program's code.

The new graphical representation is called an operands graph, which is a unique representation of code that embodies the better known properties of flow graphs and value-expression graphs. An operands graph uniquely represents instructions using a three-operand form combined with value and leaf pairs for each operand. The leaf includes the ability to represent an immediate, register, or memory location value. The values may be definite or value ranges. The operands graph also has the property of allowing an operand to be a Ø function, where the definition of a Ø function is the same as that used in SSA graphs.

The combination of SSA-like properties and value range properties allows the operands graph to enable optimizations on previously unreachable code. The best example is mutliway branch instructions. Prior art optimizers couldn't access the various branches and simply skipped the code associated with them, with the result being potentially large areas of non-optimized in use. The present invention allows for static simulation of multiway branch instructions, providing visibility into sections of code for optimization that was previously not possible.

BRIEF DESCRIPTION OF THE DRAWING FIGURES

FIG. 3A is a block diagram showing an overview of a link-time optimizer.

FIG. 3B is a block diagram showing an overview of a link-time optimizer according to the present invention.

DETAILED DESCRIPTION OF PREFERRED EMBODIMENTS

Person of ordinary skill in the art will realize that the following description of the present invention is illustrative only and not in any way limiting. Other embodiments of the invention will readily suggest themselves to such skilled persons having the benefit of this disclosure.

Figure 1:
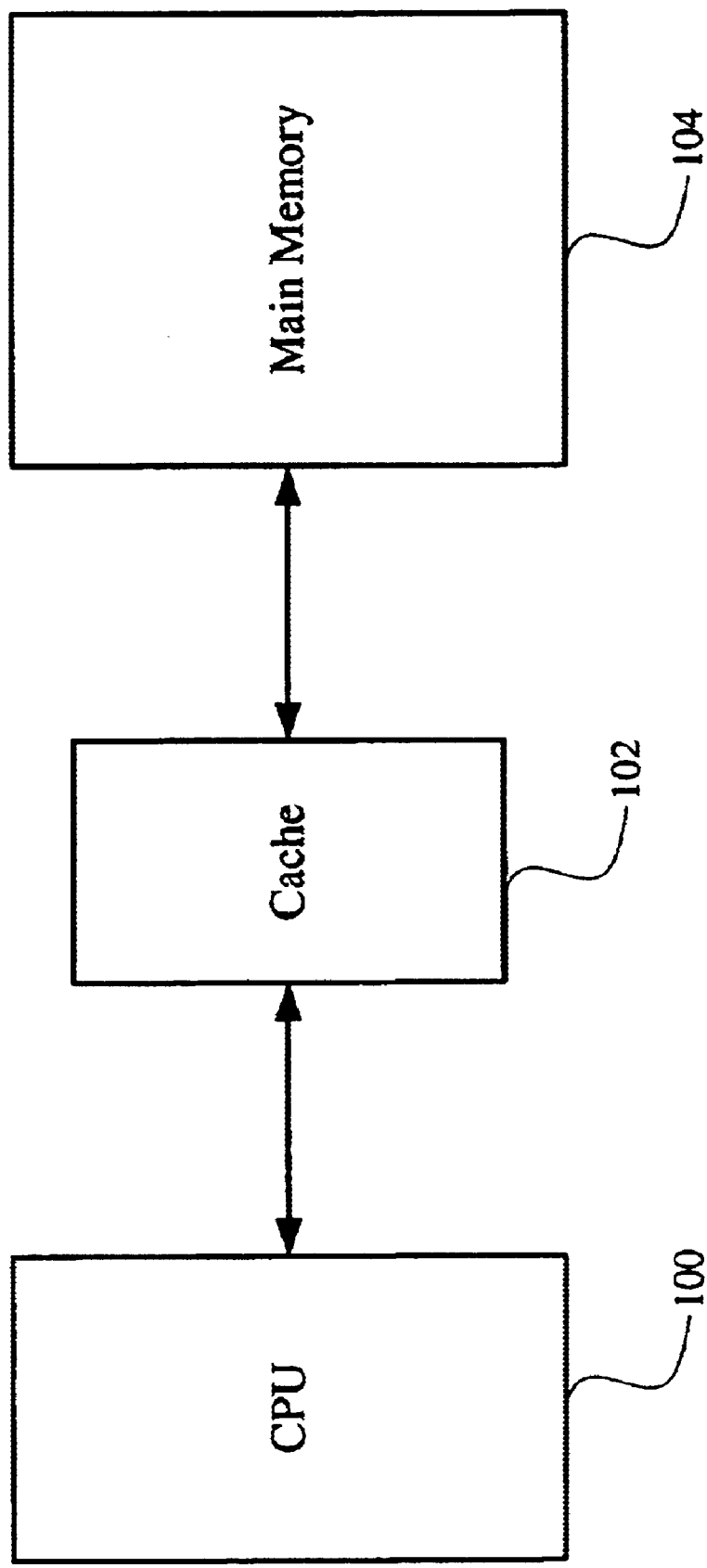
FIG. 1 is a block diagram of prior art CPU-cache-memory.
Figure 2A:
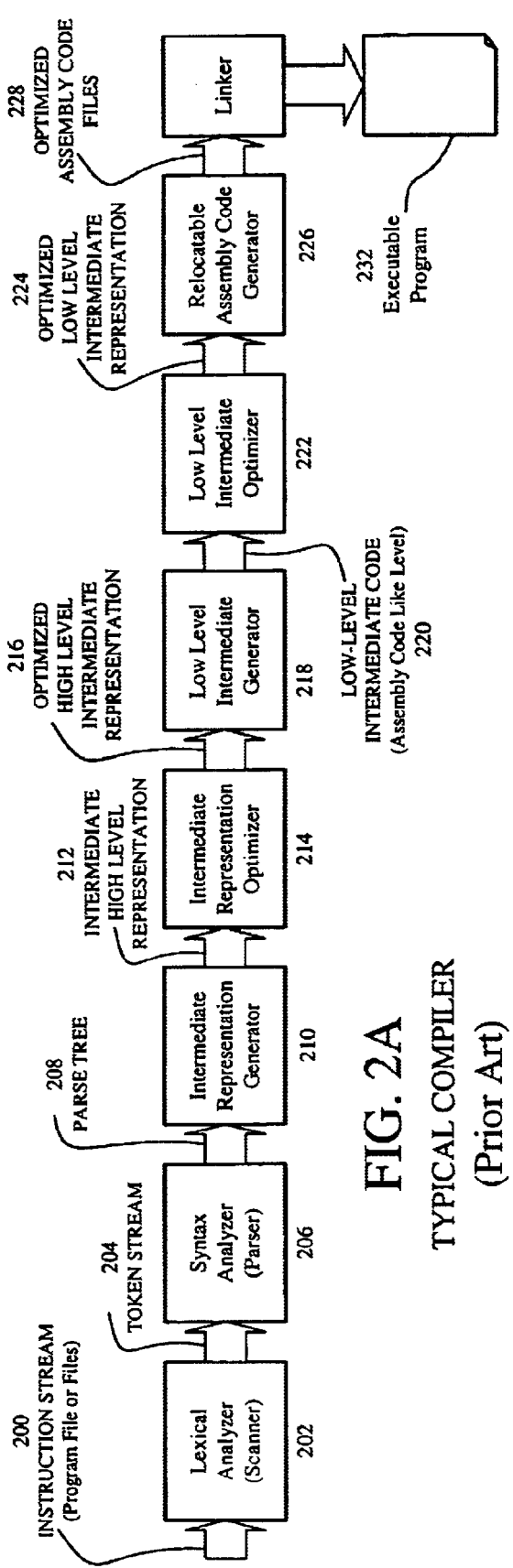
FIG. 2A is a block diagram of a conventional compiler

FIG. 2A shows the stages involved in a typical compiler. The stages will be mentioned briefly here in order to provide context for the present invention. For more detailed descriptions of these steps any of the standard books on the design and construction of software (not silicon) compilers can be used to supplement this description. An example of a standard book on the subject is "Compilers: Principles, Techniques, and Tools" by Aho, Sethi, and Ullman.

The input to a compiler is the program to be compiled. This may constitute anything from a part of a small single file containing a few instructions (or lines of code) to a large number of files contain thousands and thousands of instructions (or lines of code). From the compiler's viewpoint, this is instruction stream 200.

The initial step is identify the basic operational components of the instruction stream, the tokens. This is done in the scanner 202. The output of the scanner is a token stream 204. All the elements of the token stream are recognized ("legal") tokens of the language being parsed. Token stream 204 is fed into parser 206. Parser 206 analyzes the syntax of the token stream. If the program was syntactically correct, parser 206 creates as output a parse tree 208, which contains all the tokens in token stream 204. The parse tree 208 is used by intermediate representation generator 210 to generate the program in an high-level intermediate representation 212. The intermediate representation is then passed to intermediate representation optimizer 214. Intermediate representation optimizer 214 optimizes the program in ways suitable for this high level, such as doing a global intraprocedural analysis of the program's control and data flows. As is well known in the art, optimizations are carried out using more than one type of optimizing algorithm. Typically the compiler designers will include as many as they think they need to achieve their design goals.

The output from intermediate representation optimizer 214 is an optimized high level intermediate representation of the program, 216. This is then given to low level intermediate representation generator 218. Low level intermediate representation generator 218 generates lines of code that are very close to, or are, assembly language statements for the target processor. This code stream is then fed to low level intermediate optimizer 222. Low level intermediate optimizer 222 carries out optimizations appropriate for that level of code, such as loop optimizations, procedure optimizations, register optimizations, and instruction optimizations. As with the high level optimizers, the compiler designers will include as many optimizing steps and algorithms as they think they need to achieve their design goals. The output, 224, is an optimized version of low level intermediate representation 220. This is fed to relocatable assembly code generator 226, which generates relocatable assembly code located in one of more files, 228. Linker 230 links output files 228 into an executable file that can be run on the machine directly, shown as executable program 232.

Figure 2B:
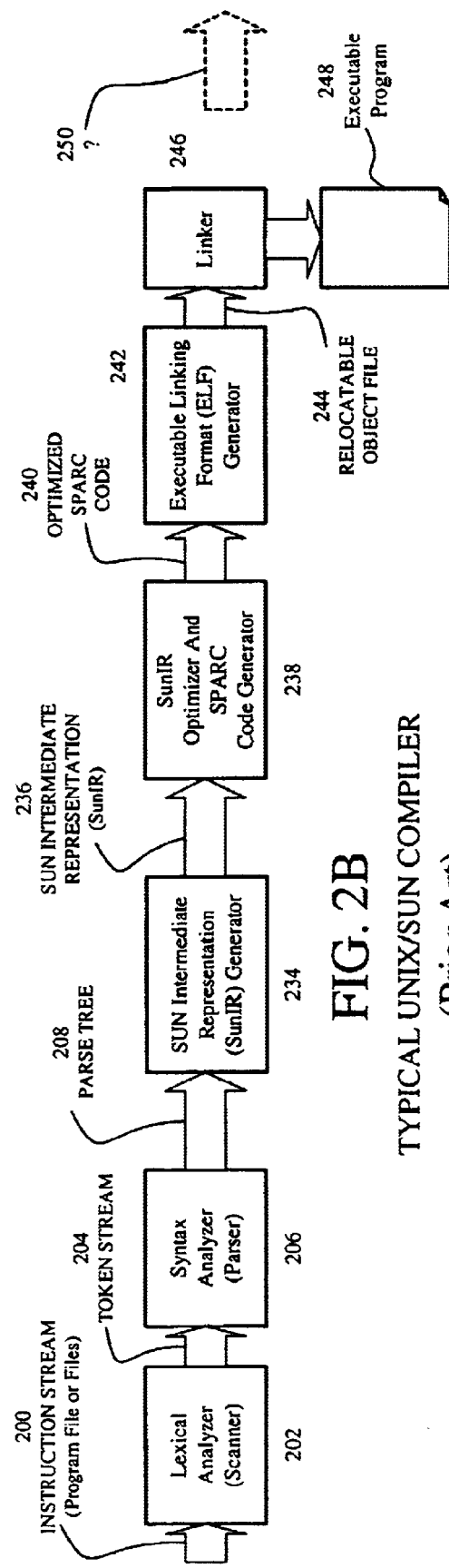
FIG. 2B is a block diagram of a UNIX/SUN compiler.

Some compilers and compiler designers don't use two levels of intermediate representations as just described, although it can be argued the difference is more semantic than content-based. FIG. 2B shows a typical UNIX compiler, and in particular a SUN Microsystems' compiler, running under Solaris®. The initial steps are the same, shown as steps 200 through 208, as in FIG. 2A. When parse tree 208 is finished, it gets translated into Sun's intermediate representation, SunIR, by SunIR generator 234. The files containing the SunIR translations, 236, are given to SunIR optimizer and SPARC code generator 238. SunIR optimizer and SPARC code generator 238 optimizes similarly to intermediate high level optimizer 212, in addition to generating SPARC-specific code. The optimized SPARC-specific code files, 240, are given to the ELF generator 242 which generates code that is ready to be linked. Linker 246 then links the code together, producing executable code in a file 248 that may be run on an actual machine.

Shaded arrow 250 indicates a possible addition to the optimizations already done. Are any optimizations done to the code base after traditional compilation completes? The answer is that it can be, as shown in FIG. 3. Some compilers include optimizers that operate on the code after traditional compilation has completed. These optimizations are called link-time or post compilation optimizations.

The output from traditional compilation includes a set of individual relocatable low-level (assembly-like level) code files, or a linked file, shown as file(s) 300. Low-level code disassembler 302 disassembles the code from a linked version of the input files 300. The output of disassembler 302 is a single file containing the entire code base. This is input to a traditional graph generator 306, which generates two graphs as are well known in the art, a Control Flow Graph and a Data Flow Graph. Two sets of related optimizations are carried out, one set in whole program optimizer 308 and one set in graph-based optimizer 310. The actual implementation boundaries between these varies, or may be folded into a single set of modules as indicated by the dashed lines connecting 308 and 310. Optimizations may also use profile feedback kept from earlier stages in the compilation process. Optimizations include instruction cache coloring and data cache coloring (identifying regions of code likely to hit or miss cache, and rearranging them to maximize cache hits) at the code block level, as well as similar optimizations at the instruction-line level.

A significant advantage of post compilation optimization is that for the first time, the entire program's code base can be scanned for optimizations. Until the post compilation stage, a program consists of a set of individual files each of which was optimized in isolation. Thus, low level optimizations such as cache misses might be optimized for some segments of code, but when put into a single executable image there are always significant cache misses triggered due to the boundaries of the code segments. Some of that can solved by some traditional post compile optimizers, but significant gaps still exist. A primary limitation is found in the optimizations that can be carried out using traditional graphs. Control flow graphs are generally limited to block-level analysis, and data flow graphs are limited in scope because they can't graph past any but the most simple branching instructions (can't handle SWITCH instructions, for example).

Continuing with FIG. 3A, assembler 312 assembles the output from optimizers 308 and 310. The output is a set of optimized relocatable object files, 314. These are given to linker 316, which generates an executable code base in file 318. This is machine ready code.

FIG. 3B shows a typical post compilation optimizer having the present invention in a UNIX/SUN environment. The input files 320 are relocatable object files, from which SPARC disassembler 322 sends a single file to operands graph generator 326. SPARC disassembler 322 generates assembly-like code called Generic Instruction Architecture (GIA) which is machine independent, shown as 324. The logically single file containing the entire compiled program in GIA format is passed to operands graph generator 326.

Operands graph generator 326 generates a new type of graph that overcomes significant limitations found in traditional Control Flow Graphs and traditional Data Flow Graphs. It will be explained more fully below, but the new graph, incorporating some of the best features of traditional graphs while overcoming their limitations, allows code segments to be reached that were previously unreachable and enables optimization of these code segments. These and other optimizations are done on boxes 328 and 330. After completing the optimizations using new graphical representations of code, SPARC assembler 332 regenerates optimized relocatable object files 334. The relocatable object files 334 are fed to linker 336, which generates machine executable code in file 338.

Although the new graphical representation of code has been shown in the context of a UNIX/SUN environment, it is in no way constrained to that environment. The invention in the present disclosure has been implemented in a UNIX/SUN environment and will therefore be shown in it; however, the inventive nature of the operands graph representation of code can readily be implemented in any environment. The present invention fully contemplates these other environments.

Prior art control flow graphs are well known in the art, and have been used for some time (see standard texts in the area such as "Compilers: Principles, Techniques, and Tools" by Aho, Sethi, and Ullman). One particular type of control flow graph has attracted much attention, the Static Single Assignment (SSA) form of control flow graphs. An SSA representation of a code base (or program or instruction stream) is generated from a conventional control flow graph, which was generated from the code base. The SSA has become popular for representing code bases in optimizing compilers because it provides accurate variable use, variable definition (use-def) relationships among the program variables in a concise form. Many efficient global optimization algorithms have been developed based on SSA. Among these optimizations are dead store elimination, constant propagation, and global value numbering.

SSA form is an intermediate level representation that allows optimizations to be done more efficiently then previous forms of flow control graphs. Every variable receives exactly one assignment during its lifetime. This is accomplished by having every use of any variable in the program being assigned exactly one definition at a particular iteration of code, facilitating the examination of control structures such as loops in a concise form. Renaming of all variable definitions is performed uniquely (including Ø functions, discussed below) using name extensions at each place the code joins, creating a graphical form where there is always a unique assignment for any given variable. This property gives rise the graph's name, static single assignment, and is fundamentally what makes it a tractable optimization tool for high level intermediate representations.

In addition, at all junction points in the code SSA introduces the concept of the choosing function, usually referred to as a Ø function, represented as Ø(arg1, arg2, . . . , argn). Ø functions are added at each place where program flow divides or joins. The arguments to the Ø function are the possible values entering the decision point or calculation point, from which one is chosen (or a function dependent on it is chosen) and a branch taken. It is well beyond the scope of this application to attempt a general discussion of SSA and Ø functions, but such descriptions are well covered in the literature. For the purposes of this disclosure, the evaluation of a Ø function may be thought of as heuristically derived, where such heuristics are partially based on the path the program will take out of the junction point in question.

The use of the Ø function simplifies the book-keeping for various optimizations, and by maintaining a single point of definition for every variable allows the algorithms to be expanded in linear, rather than quadratic, time. The Ø function also allows for accurate identification of state-machine registers in situations like loop translations. The Ø function allows variable merging, derived from the value of the variables on distinct incoming control flow paths.

Optimizations based on SSA all share the common characteristic that they do not require traditional iterative data flow analysis in their solutions. They can take advantage of the sparse representation of SSA, where information associated with an object is represented only at places where it changes and where the object actually occurs in the program. Because it does not replicate information over the space information can be propagated through the sparse representation in a small number of steps, speeding up most algorithms. To get the full benefit of sparseness, one must typically give up operating on all elements in the program in parallel, as in traditional bit-vector-based data flow analysis. But operating on each element separately allows optimization decision to be customized for each object.

The SSA form, while useful as an intermediate representation for optimizing programs, has problems when applied to low level optimizations. The traditional SSA form and optimizations are not applicable to programs represented at or near assembly instruction level because the use of dedicated registers imposed by calling conventions, the runtime system, and the fact that the target processor architecture must be made explicit, which complicates the form tremendously.

Other techniques have been applied at intermediate and low levels. One such technique is called value range optimization. While the value of a variable may not be known or may vary, the possible range of values may be known which can be used to perform optimizations.

As an example, consider the following C code fragment.

```
for(i = 1; i < 100; i++)
{
    o
    o
    o
    if (i)
        g();
    o
    o
    o
}
```

Notice the value of i is known to be in the range 1 to 99 inclusive. That means the IF expression will always evaluate to true; the IF test can be eliminated. In changed code fragment is shown below.

```
for (i = 1; i < 100; i++)
{
    o
    o
    o
    g();
    o
    o
    o
}
```

Although the example just given was trivial because the boundaries of the variable i were fixed, it illustrates the idea behind value range optimizations. When value ranges are known, many conditionals can be simplified and that may lead to many optimizations, including the identification of dead code and similar situations.

There are many problems with using value range optimizations over an extended code base. One is dealing with unknowns at any particular branch. Although some values and value ranges may be identified, others may not, and it is rarely known where the code may go at, say, a multibranch instruction such as a SWITCH or CASE instruction. In such situations it would be necessary to carry out actual loop iterations, imposing an insurmountable complexity problem. Although useful, this type of application has only been applied to very localized areas of code.

The present invention discloses a new graph that has the advantages of SSA and of value range optimizations. Using the new graphical representation in post compiler optimizations has yielded optimization benefits, including the optimization of code segments that were previously not reachable. The new graph is called a operands graph.

Figure 4B:
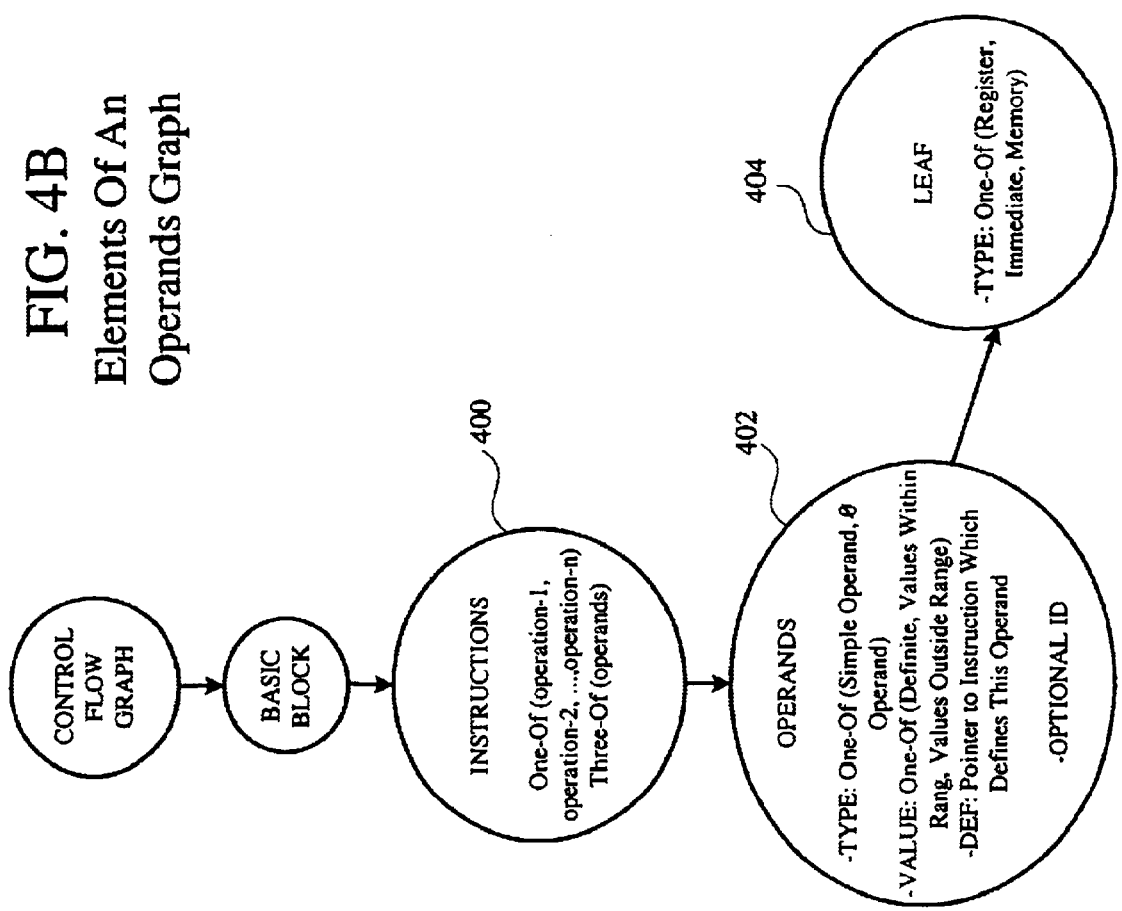
FIG. 4B is a diagram showing some graphical elements according to the present invention.
Figure 4A:
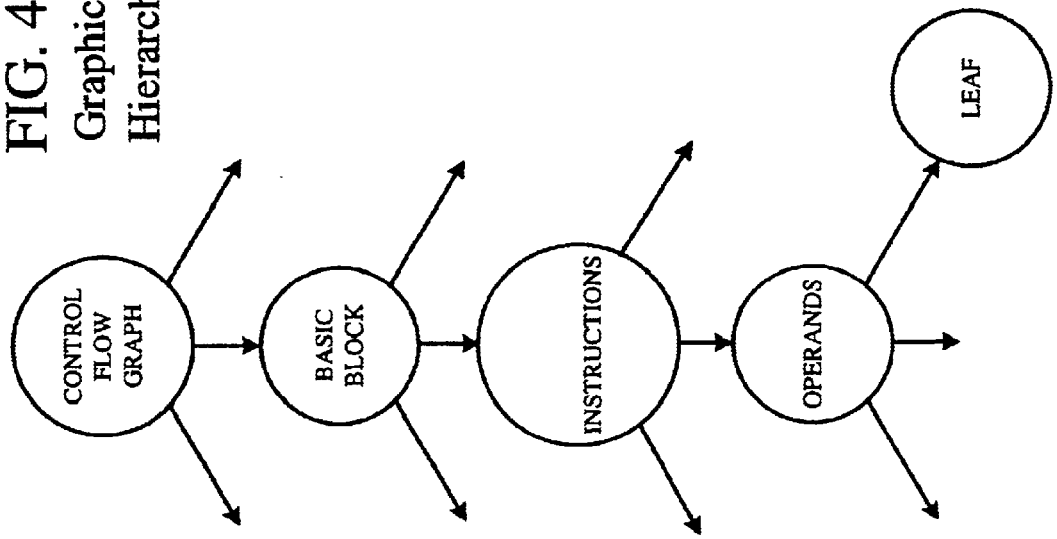
FIG. 4A is a diagram showing graphical component hierarchy.

An operands graph has the following general construction. It is initially constructed as a flow graph, creating the basic blocks of code. There are no edges; instructions are kept in the block structure. Each instruction is represented in a general three operand form, where relationships and properties are recorded in definitions of the operations and in leaf components coming from operands. See generally FIG. 4, showing the relationships from the largest to the smallest graphical component.

Creating an operands graph starts with a traditional flow graph form generation method. The instructions (shown as 400 in FIG. 4) in the blocks (assembly code level instructions) are then translated into three operand form. Each instruction will have four parts: the operation (load, store, add, etc.), a first operand and a second operand on which to operate, and a third operand which is a target location for the result.

Each operand (shown as 402 in FIG. 4) will be one of two types, a simple type or a Ø function. A Ø function is handled in the same why that the same function type is handled in an SSA graphical application. A simple function is anything that is not a Ø function. Each operand also has associated with it a value and a pointer to a defining instruction, and may have another field called an ID field. The ID is optional.

```
OPERAND
    - TYPE: one-of(simple operand, Ø operand)
    - VALUE: one-of( definite [known values, enumerated values,
                        calculated values, excluded values],
                values within a range
                    [expressed as a triplet (x, y, z) where x is
                    an initial value, y is upper value, and z is
                    an increment],
                values outside a range
                    [expressed as a triplet (x, y, z) where x is
                    an initial value, y is upper value, and z is
                    not currently used]
                )
    - DEF: pointer to which instruction defines this leaf
    - ID: a unique ID for this operand (optional)
```

Each leaf (shown as 404 in FIG. 4) will have the following definitional component:

TYPE: one-of (register, immediate, memory)

The information kept for each operand contains all the information normally found within an SSA-type graph, without the edge representation style limitations. Each leaf type and definition pointer is a unique combination, and the information fields provide the ability to carry out value range calculations and related optimizations without the need for iterative calculations. Thus the new operands graph has a new set of capabilities; it has the ability to allow evaluation of control structures such as loops without iteration, and using value range information coupled with non-iterative program evaluation allows the evaluation of structures that have defied previous flow control graphs such as CASE/SWITCH statements.

Due to its capability of evaluating CASE/SWITCH control structures, code reached from branches of such structures can now be optimized that was previously never reachable. In addition, this property allows the local optimization of library functions and other code modules being compiled into the total program—another substantive body of code that previously could not be optimized for the target processor by the compiler.

Expanding further on non-iterative program evaluation capability, the operands graph has the ability to carry out a static simulation of a program or portions of a program. The ability to perform static simulation of program fragments is an extremely powerful and unique feature of the operands graph. Static simulation is the process of generating an outcome from executing a fragment of a program that is independent of contextual information from both the rest of the program and from any data sets the program may operate on. Static simulation enables the assignment of values or value ranges to one or more operands in a code segment.

Static simulation uses the value ranges or known values associated with operands coupled with the dependencies to evaluate portions of the program. Exact values may not be known but ranges of values, or sets of values, often are. Static simulation carries out arithmetic evaluations of the expressions or ranges of values that an operand is known to have. For example, if an register r1 is known to have a value within range (0, 99, 1) and register r2 has value 50, then "add r1 r2 r4" leaves r4 with the value within range (50, 149, 1). Operations that can be performed on operand's values and value-ranges include all the standard arithmetic, bit-wise, and logical operations, including but not limited to: +, −, /, *, <<, >>, |, &. Calculations of this type in general (outside the graph context) are known in the art under the general heading of interval arithmetic.

An example of a difficult problem that yields to the present invention is the evaluation of SWITCH statement (a multi-branch instruction). The prior art could not effectively evaluate a SWITCH or SWITCH-like statement, so prior art optimizers simply skipped all portions of the code that originated from the multiple branches of a SWITCH statement, and returned to the section of code from which the call to the SWITCH was made. Thus, there were always sections of code (blocks, in the flow graph) that were never optimized, and these sections could be very large and significant.

The present invention can address SWITCH statements, allowing these previously missed sections of code to be optimized. When a SWITCH or other multibranch instruction is reached, the value or value ranges (and steps) can be calculated locally (using only the entries in the operands graph), allowing the likely entry points into the code after the SWITCH or other multibranch statement to be calculated. It works by keying off of the known base address of the SWITCH statement. The value ranges or set of fixed values that will be calculated from the operands in the SWITCH statement correspond to offsets from the SWITCH statement's known base address. Each value is a jump-to point, or base address plus offset, and the code can be evaluated starting at that entry point.

The following is one illustration of static simulation as applied to the evaluation of the targets of a switch statement. This is one of many problems not previously solvable but which the present invention has been able to solve. The illustration is expressed in SPARC v9.0 assembly code, but the method is applicable to any assembly code. First, more background is given on the structure of a SWITCH statement.

The code generated to do a multiway branch instruction, of which a SWITCH statement is one, involves the construction of a switch table whose elements are an offset from the base address of the table, locating the code (labels) for each multiway branch.

The contents of the switch table (Lst) may look like the following (EA stands for effective address of a memory location).

```
Lst:         ! switch table with 5 cases
    .word 32    ! EA of the first case label is Lst+32
    .word 56    ! EA of the second case label is Lst+56
    .word 72    ! EA of the third case label is Lst+72
    .word 96    ! EA of the fourth case label is Lst+96
    .word 108   ! EA of the fifth case label is Lst+108
```

A code fragment containing a switch statement will look like the following.

```
    ...
    cmp   %o0,4         ! Compare the contents of register
                        ! %o8 with 4 and set the condition
                        ! code register (%icc).
    bgu   Lout          ! If the above comparison showed
                        ! that %o0 is greater than 4 or
                        ! less than 0, then branch to the
                        ! label marked "Lout" - if this branch
                        ! were taken the value of %o0 is
                        ! OutsideRange(0,4,x)
    sethi %hi(Lst),%o3     ! Load the most significant 22 bits
                        ! of the address of the switch table
                        ! (Lst) into the register %o3.
    add   %o3,%lo(Lst),%o3  ! Add the least significant 10 bits
                        ! of the address of the switch table
                        ! (Lst) so that %o3 contains the
                        ! address of the switch table (Lst).
```

-continued

```
    Sll   %o0,2,%o2     ! Multiply the value of %o0 by 4
                        ! (which is the same as shifting
                        ! the value left by 2) and place
                        ! the result in %o2. The value
                        ! of %o0 here is WithinRange(0,4,1).
                        ! After multiplication the result
                        ! in %o2 will be WithinRange(0,16,4).
    ld    [%o2+%o3],%o4    ! Add the contents of %o2 and %o3
                        ! and use the sum as the effective
                        ! address to load from memory. Load
                        ! a 32-bit integer at this effective
                        ! address into %o4. Here %o2 contains
                        ! the value WithinRange(0,16,4) and
                        ! %o3 contains the address of the
                        ! switch table (Lst). So the values
                        ! read into %o4 will be one of:
                        ! contents of Lst+0 (=32), or,
                        ! contents of Lst+4 (=56), or,
                        ! contents of Lst+8 (=72), or,
                        ! contents of Lst+12 (=96), or,
                        ! contents of Lst+16 (=108)
    jmpl  %o4+%o3,%g0      ! Jump indirect to the effective
                        ! address specified by the sum of
                        ! the contents of %o4 and %o3. Thus
                        ! the address of the branch target
                        ! can be one of:
                        ! Lst+32, (say, Ldest1), or,
                        ! Lst+56, (say, Ldest2), or,
                        ! Lst+72, (say, Ldest3), or,
                        ! Lst+96, (say, Ldest4), or,
                        ! Lst+108 (say, Ldest5)
    nop                 ! Delay slot instruction - does
                        ! nothing.
    ...
Lout:
    ...
Ldest1:
    ...
Ldest2:
    ...
Ldest3:
    ...
Ldest4:
    ...
Ldest5:
    ...
```

Before static simulation the operands graph appears as follows.

Notations:

1. Each instruction will be identified by the number in front of its listing.
2. Each operand has the form (id,leaf,def,value) where:
   id: unique name for the operand to show where the same operand appears in different instructions. For example, the example below the operand D appears in three places (in instructions #4, #6 and #7).

```
leaf    : a leaf in the operands graph, say, a register number like %o0
def     : the pointer (number) of the instruction defining it - an 'x'
``` indicates a don't care value

```
value   : an expression of the form:
          Equal(0) or WithinRange(0,4,1)
          - an 'x' indicates a don't care value
```

3. For sake of convenience the immediate operands (for example the constant 4 in instruction # 1) have been represented as such and not in the "operand" format explained in #1 above. The same is true for %g0, which in SPARC means a hardwired ZERO register.

The data flow graph (operands graph) before static simulation:

```
1. cmp(A,%o0,x,x),4        ! implicitly defined (B,%icc,x,x)
2. bgu Lout                ! implicitly uses (B,%icc,x,x)
                           ! implicitly defines (X,%o2,2,x)
                           ! implicitly defines (Y,%o2,2,x)
3. sethi %hi(Lst),(C,%o3,3,x)
4. add    (C,%o3,3,x),%lo(Lst),(D,%o3,4,x)
5. Sll    (Y,%oO,2,x),2,(F,%o2,5,x)
6. ld     [(F,%o2,5,x)+(D,%o3,4,x)],(G,%o4,6,x)
7. jmpl         (G,%o4,6,x)+(D,%o3,4,x),(H,%g0,7,x)
8. nop
```

Comments on the above graph:
1. Branch instructions define all values that are live up to that point—for example the branch instruction #2 defines two operands X and Y which are both linked to operand A but X also records the fact that it is the value of A if the branch is taken and Y records the fact that it is the value, of A if the branch was not taken. Thus the operand of instruction #5 is Y (and not X.
2. The operands are shared among instructions, to know if they are the same operand a name is used (in the actual implementation the name is not used, as pointer values are unique).

A static simulation is carried out to evaluate the multibranch targets. The static simulation of the above sub-graph starts when a "jmpl" instruction is seen during control-flow graph construction, which is assumed to be a switch instruction (soon confirmed if this is a switch statement or not), at which point the flow-graph is to "evaluate" the "jmpl" instruction (the instruction #7 in the above example). The following events happen (the indentations are used to show the relative dependencies).

* The operands of the "jmpl" instructions are first evaluated - they are (G,%o4,6,x) and (D,%o3,4,x).
  * When (G,%o4,6,x) is evaluated the instruction that defined it (i.e. instruction #6 is evaluated).
    * The operands of instruction #6 (ld) are then evaluated - they are (F,%o2,5,x) and (D,%o3,4,x).
      * When (F,%o2,5,x) is evaluated instruction #5 is evaluated).
        * When instruction #5 is evaluated we see that it depends on (Y,%o0,2,x) and a constant 2.
          * (Y,%o0,2,x) was defined by the branch instruction and it represents the value of A when the branch is not taken - set the value of Y to be WithinRange(0,4,1). After the shift-left-by-2 the value of F becomes WithinRange(0,16,4).
      * When (D,%o3,4,x) is evaluated instruction #4 that defines it is evaluated.
        * When instruction #4 is evaluated, first evaluate (C,%o3,3,x)
          * When (C,%o3,3,x) is evaluated, #3 is evaluated which has only constant operands. The value of %hi(Lst) is set for C.
        * The value of C and %lo(Lst) are added to give (Lst) which is the value of D.
    * Now that the values of F and D are known, the value of G can be computed. The value of F is WithinRange(0,16,4) and the value of D is Equal(Lst) - thus the effective addresses that can be loaded by this instruction is given by the set expression: {Equal(Lst+0), Equal(Lst+4), Equal(Lst+8),Equal(Lst+12), Equal(Lst+16)} As the switch table is in a read-only section, the optimizer can actually read the contents of the object files at these effective addresses and yield a set {Equal(32), Equal(5 6),Equal(72),Equal(96),Equal(108)} which is the value of G.
* Now the value of G and D are known and the set of all possible switch targets can be evaluated:
  G is {Equal(32),Equal(56),Equal(72),Equal(96), Equal(108)} and D is (Lst) - thus the various switch targets that are reachable from the "jmpl" are is given by the value of H which is: {Equal(Lst+32), Equal(Lst+56),Equal(Lst+72),Equal(Lst+92),Equal(Lst+108)}

Once the set of switch targets is calculated the rest of the program is available for disassembly, and the portions of the program which were originally hidden by the "jmpl" statement are visible. The operands graph after the evaluation of the jmpl will look like the following (for sake of clarity the values are denoted as V1, V2, . . . etc., whose values are annotated below):

```
1. cmp(A,%o0,x,x),4        ! implicitly defined (B,%icc,x,x)
2. bgu Lout                ! implicitly uses (B,%icc,x,x)
                           ! implicitly defines (X,%o2,2,x)
                           ! implicitly defines (Y,%o2,2,V1)
3. sethi %hi(Lst),(C,%o3,3,V3)
4. add    (C,%o3,3,V3),%lo(Lst),(D,%o3,4,V4)
5. sll    (Y,%o0,2,V1),2,(F,%o2,5,V2)
6. ld     [(F,%o2,5,V2)+(D,%o3,4,V4)],(G,%o4,6,V5)
7. jmpl   (G,%o4,6,V5)+(D,%o3,4,V4),(H,%g0,7,V6)
8. nop
where:    V1 : WithinRange(0,4,1)
          V2 : WithinRange(0,16,4)
          V3 : Equal(%hi(Lst))
          V4 : Equal(Lst)
          V5 : {Equal(32),Equal(56),Equal(72),Equal(96),Equal(108)}
          V6 : {Equal(Lst+32),Equal(Lst+56),Equal(Lst+72),
                  Equal(Lst+92),Equal(Lst+108)}
```

The present invention is thus shown to effectively deal with a mutliway branch without simply "skipping" code by executing the return jump statement.

Figure 5:
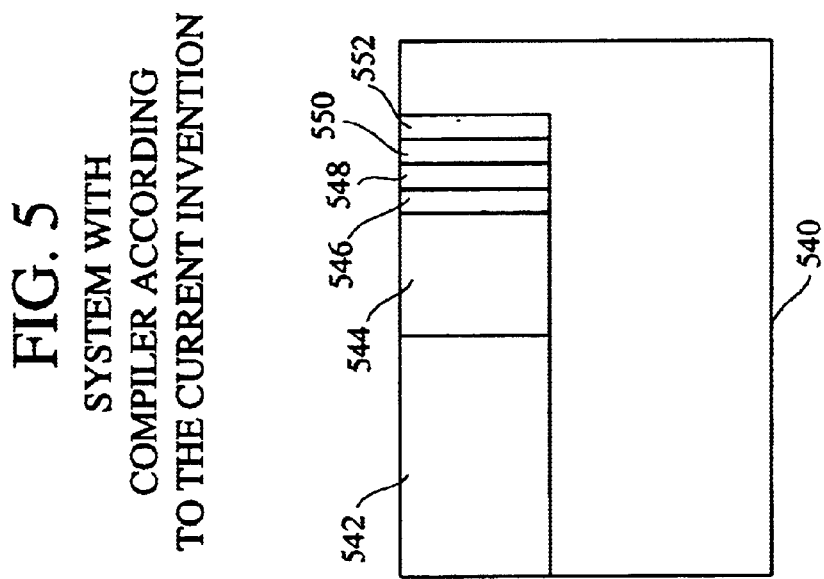
FIG. 5 is a block diagram of the present invention in a system.
Figure 5:
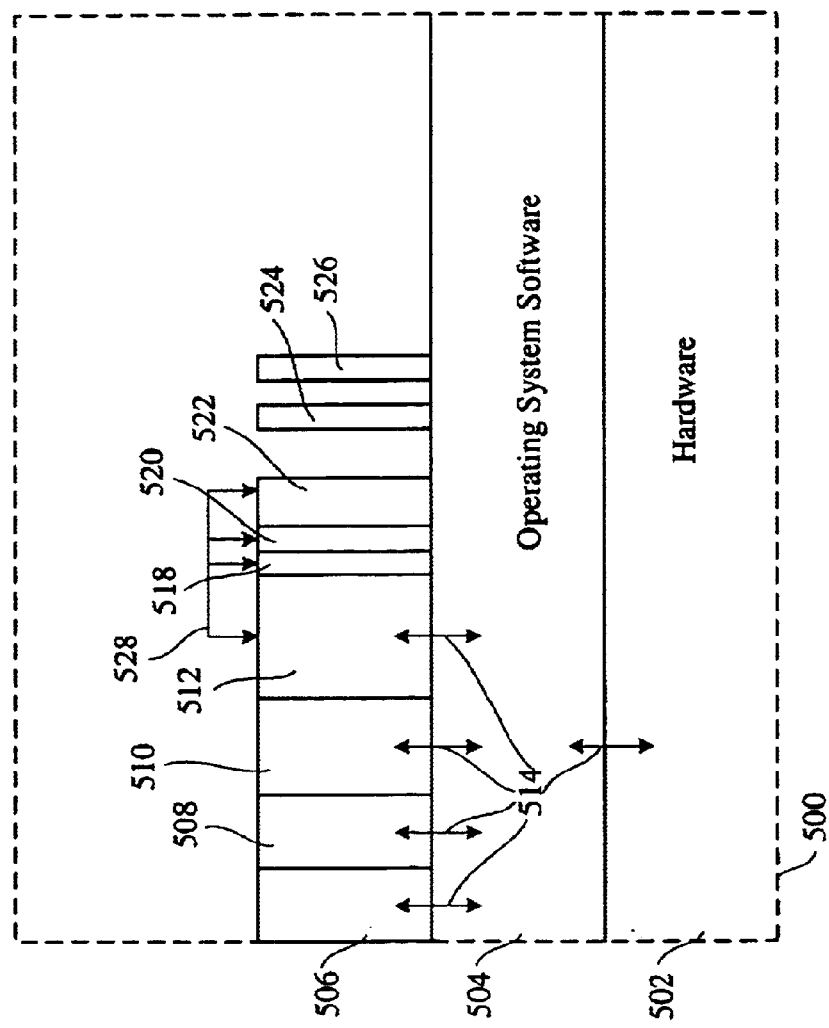

Referring now to FIG. 5, a block diagram of a system running the present invention is shown. Computing device 500 has a hardware base 502 and an operating system 504. These two components are of conventional design using well known components and are exemplified by a Sun Microsystems Ultra 60 Workstation running the Solaris v0.7 operating system. The hardware and operating system must be minimally adaptable and configurable to act as support to run the present invention, such systems typically going under than name of workstations or servers. Any system providing enough system resources will work with the present invention. On top of operating system 504 are various applications, shown as 506, 508, 510, and 512. The arrows indicated by 514 show the parts of the system that are directly interacting with each other. Operating system 504 is continually interacting with hardware 502 as well as each of the applications 506, 508, 510 and 512. The application programs 506, 508, 510, and 512 make use of system services, system resources, and hardware resources through operating system 504.

Application 512 is a compiler program according to the present invention. The application programs 506, 508, and 510 are shown for illustrative purposes only, and may or may not exist in any particular system on which the present invention is installed. They are not required nor are they a part of the present invention; they exist independently of, and may coexist with, the present invention.

Overall, compiler application 512 contains many functional modules including those needed to compile any given source code program into relocatable assembly code. The implementation of a compiler with modules according to the present invention may be implemented in a traditional language such as C or C++, or other suitable language. As will be appreciated by one of ordinary skill in the art and with the benefit of the present disclosure, the compiler may be implemented in any number of ways and with considerable variance in overall functionality while still encompassing the inventive nature of the present disclosure.

Continuing on in FIG. 5, compiler program 512 is reading from source files, using interim files, and writing to target files, shown as files 518, 520, and 522. The interactions between compiler program 512 and the files is indicated by communication arrows 528. Other source files, which may be library files or other system resident files, are shown as 524 and 526 and have not yet been called by the compiler. As will be appreciated by those of ordinary skill in the art and with the benefit of the present invention, there may be any number of source, target, and interim files.

The server's main memory is shown as 540. 542 is memory space taken up by the operating system. 544 is the main memory space occupied by the compiler application program according to the present invention. Source files, target files, and interim files are shown as 546, 548, 550, and 552.

Figure 6:
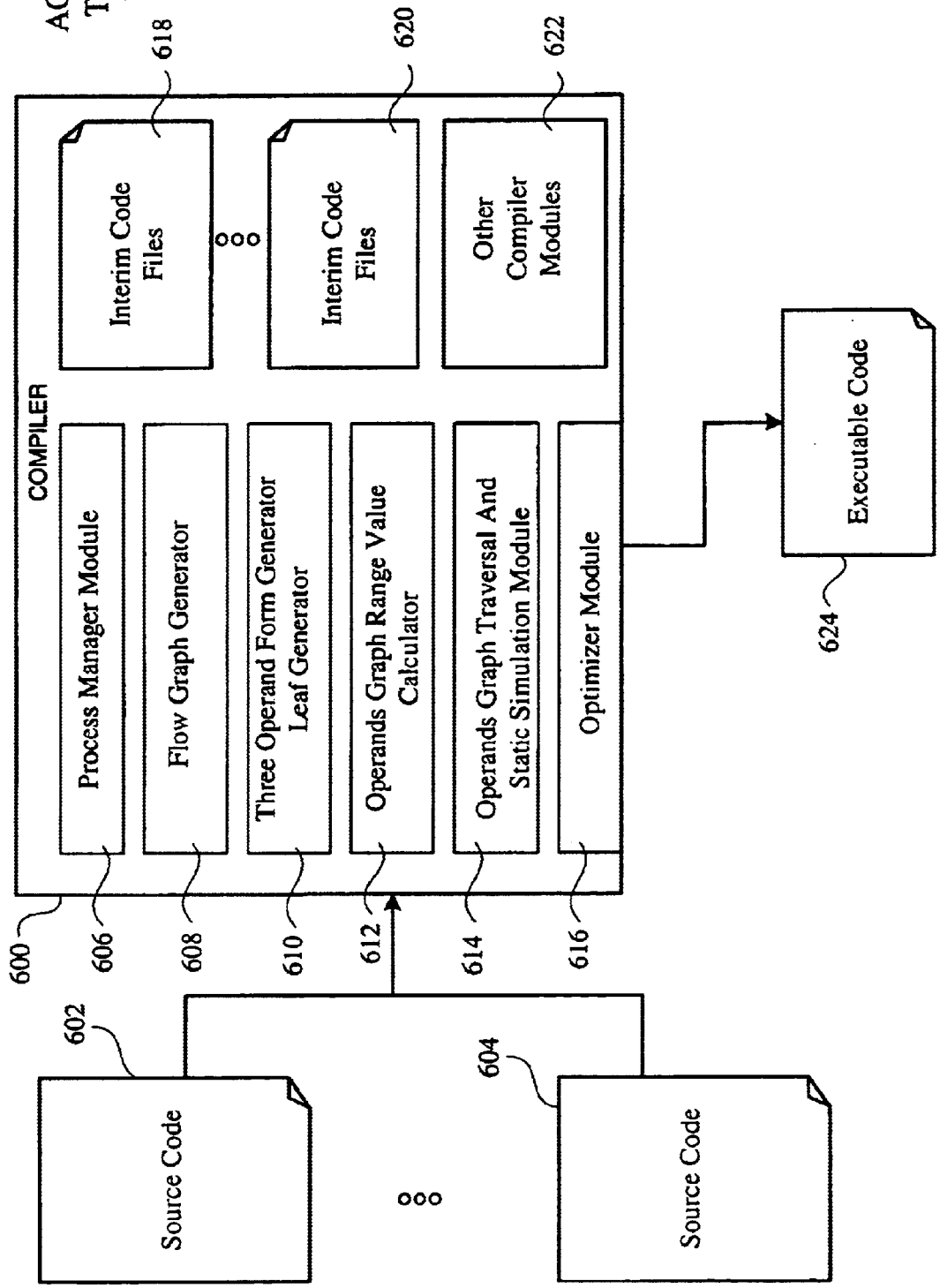
FIG. 6 is a block diagram of a compiler according to the present invention.

Referring now to FIG. 6, a functional block diagram of a compiler program according to the present invention is shown. Compiler 600 reads from source files, shown as 602 and 604. There may be any number of source files, indicated by the ellipses between source file 602 and source file 604. During the compilation process, various interim files are created, shown as files 618 and 620. There can be any number of such files, as shown by the ellipses between files 418 and 420. The overall process is controlled by process manager module 606.

When discussing functional module components implemented in software of the present invention, "module" is used to mean any collection of lines of code found on machine readable media that perform the indicated function. Typically such lines of functionally related code will be organized into a closely associated set of routines, files, functions, and other software engineering elements. However, regardless of how the actual lines of code are physically distributed in the code base that provides the functionality being described, those lines of code comprise the embodiment of the functional blocks.

After the source files are compiled into a linked file by other components of the compiler (shown generally as functional block 622), the linked file is passed by the process manager 606 to three operand from and leaf generator 610. Flow graph generator 608 is shown as it is needed in order to generate the operands graph; however, the flow graph has usually been created earlier in the compilation process. If the flow graph was generated at an earlier step in the compilation process it need not be repeated here; if the graph was not generated or was incomplete, transformed, etc., then another flow graph needs to be created. Whenever it is done, flow graph generator 608 needs to generate a flow graph of the compiled code base.

Process manager 606 passes control of the flow graph and compiled file or files to three operand form and leaf generator 610. Three operand form and leaf generator 610 finished the creation of the operands graph. Using the flow graph, it goes through each instruction in the code base and carries out the translation into three operand form while filling in all the leaf elements.

After three form and leaf generator 610 is finished, process manager 606 passes control of the file or files to optimizer module 616. Optimizer module 616 makes use of operands graph range value calculator 612 and operands graph traversal and static simulation module 614 as needed for target optimizations. Optimizer module 616 can also accept user originated (typically programmer input) on optimization choices to use. After optimizer module 616 has completed its optimizations, the result of the overall process is an executable code file, shown as file 624.

A compiler embodying the present invention will run on any computer system having a standard configuration as a development system. The present invention is embodied in various machine readable media on the system, on which are stored programs, data, and data structures. It is contemplated that any media suitable for use with the program and its accompanying data and data structures is within the scope of the present invention. Examples would include memory and other relatively fast-access semiconductor media, as well as magnetic or optical secondary storage media.

While embodiments and applications of this invention have been shown and described, it will be apparent to those or ordinary skill in the art and with the benefit of the present disclosure that many more modifications than mentioned above are possible without departing from the inventive concepts contained herein. The invention, therefore, is not to be restricted except in the spirit of the associated claims.

What is claimed is:

1. A method for optimizing code in a program, the program having executable code for a device having a processor operatively coupled to memory, the method comprising:

defining a flow graph with basic blocks from said program;

converting instructions in said program to three-operand form;

creating operand and leaf nodes with at least type, value, and definition entries for each of said operands; and optimizing code using said basic blocks, said three-operand form and said operand and said leaf node entries.

2. The method of claim 1, wherein said flow graph is the same flow graph generated by a compiler program before said method for optimizing code in a program initiates.

3. The method of claim 1, wherein said optimizing further includes static simulation using at least a portion of said program.

4. The method of claim 1, wherein said optimizing further includes static simulation of at least one multibranch instruction in said program.

5. The method of claim 4, wherein said optimizing further includes optimizing code associated with at least one branch of said multibranch instruction.

6. The method of claim 1, wherein said defining a flow graph with basic blocks from said program and said converting instructions in said program to three-operand form and said creating operand and leaf nodes with at least type, value, and definition entries for each of said operands are carried out on sections of code in said program incorporated from shared libraries.

7. The method of claim 6 wherein static simulation is carried out on portions of said code incorporated from said shared libraries, and optimizing said code using results of said static simulation.

8. A program storage device readable by a machine, tangibly embodying a program of instructions executable by the machine to perform a method for optimizing code in a program, the program having executable code for a device having a processor operatively coupled to memory, the method comprising:

defining a flow graph with basic blocks from said program;

converting instructions in said program to three-operand form;

creating operand and leaf nodes with at least type, value, and definition entries for each of said operands; and optimizing code using said basic blocks, said three-operand form and said operand and leaf node entries.

9. The storage program device of claim 8, wherein said flow graph is the same flow graph generated by a compiler program before said method for optimizing code in a program initiates.

10. The storage program device of claim 8, wherein said optimizing further includes static simulation using at least a portion of said program.

11. The storage program device of claim 8, wherein said optimizing further includes static simulation of at least one multibranch instruction in said program.

12. The storage program device of claim 11, wherein said optimizing further includes optimizing code associated with at least one branch of said multibranch instruction.

13. The storage program device of claim 8, wherein said defining a flow graph with basic blocks from said program and said converting instructions in said program to three-operand form and said creating operand and leaf nodes with at least type, value, and definition entries for each of said operands are carried out on sections of code in said program incorporated from shared libraries.

14. The storage program device of claim 13, wherein static simulation is carried out on portions of said code incorporated from said shared libraries, and optimizing said code using results of said static simulation.

15. A code scheduler component apparatus for use in optimizing code in programs, said programs being executable in a device having a processor operatively coupled to memory comprising:

a flow graph generator operably connected to said code in said programs, configured to produce a flow graph for each program;

a three-operand and leaf generator module operably connected to said flow graph and to said code in said program, configured to translate said code to three-operand form and create operand and leaf nodes and values therein for operands, ending with an operands graph associated with each program thereby;

an operands graph value range calculator operably connected to said at least one operands graph and configured to calculate value ranges for Programs or portions of programs having an associated operands graph and at the request of any other module;

an operands graph traversal and static simulation module operably connected to said operands graph and said operands graph value range calculator, configured to traverse said graph and to identify reschedulable code, and to carry out static simulations of said program and portions of said code using said operands graph value range calculator; and an optimizer module operably connected to said flow graph generator and operably connected to said three-operand and leaf generator module and operably connected to said operands graph value range calculator and operably connected to said operands traversal and static simulation module, configured to use said flow graph, said operands graph, and said value ranges on any portion of said code in said associated program to reschedule said code, optimizing said code thereby.

16. The apparatus of claim 15, wherein said flow graph generator generates a flow graph for a program by using a flow graph already generated by compiler components which previously compiled said program.

17. The apparatus of claim 15, wherein said optimizer module is further configured to carry out static simulation over at least a portion of said program.

18. The apparatus of claim 15, wherein said optimizer module is further configured to carry out static simulation of multibranch instructions in said program, and is further configured to optimize code in said program reached thereby.

19. The apparatus of claim 15, wherein said optimizer module is further configured to operably use said flow graph generator, said three-operand form and leaf generator, said operands graph value range calculator, and said operands graph traversal and static simulation module for converting instructions in said program incorporated from shared libraries to an operands graph, and using said operands graph for optimizing said shared library code.

* * * * *